(12) United States Patent
Ishimaru et al.

(10) Patent No.: US 6,363,815 B1
(45) Date of Patent: Apr. 2, 2002

(54) TRANSMISSION MECHANISM OF VEHICLE WITH HST

(75) Inventors: Yoshitaka Ishimaru; Shusuke Nemoto, both of Osaka (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 09/446,148

(22) PCT Filed: Apr. 13, 1999

(86) PCT No.: PCT/JP99/01946

§ 371 Date: Dec. 15, 1999

§ 102(e) Date: Dec. 15, 1999

(87) PCT Pub. No.: WO99/52733

PCT Pub. Date: Oct. 21, 1999

(30) Foreign Application Priority Data

Apr. 15, 1998 (JP) ............................................ 10-104698
Jun. 5, 1998 (JP) ............................................ 10-158028

(51) Int. Cl.[7] ........................... B60K 17/10; B60K 20/02
(52) U.S. Cl. ........................ 74/730.1; 74/720; 475/198
(58) Field of Search ............................... 74/720, 730.1; 475/198; 180/53.7, 242

(56) References Cited

U.S. PATENT DOCUMENTS

| 4,138,907 A | * | 2/1979 | Melles ......................... 475/74 |
| 4,640,378 A | | 2/1987 | Dobberpuhl et al. ........ 180/53.1 |
| 4,887,686 A | | 12/1989 | Takei et al. .................. 180/211 |
| 5,679,085 A | * | 10/1997 | Fredrikson et al. ........... 475/76 |
| 5,785,623 A | * | 7/1998 | Iino et al. ...................... 475/82 |
| 5,823,285 A | | 10/1998 | Tsuchihashi et al. ......... 180/242 |

* cited by examiner

*Primary Examiner*—Sherry Estremsky
(74) *Attorney, Agent, or Firm*—Knobbe, Martens, Olson & Bear, LLP

(57) ABSTRACT

The invention provides a transmission mechanism for use in a vehicle including a vehicle body having one side toward a first direction along the length thereof and the other side toward a second direction opposite to the first direction, the vehicle comprising a differential gear unit 11, an HST 8 and an engine 7 which are arranged in the vehicle body from the first direction side toward the second direction. A transmission 10 is provided between the differential gear unit 11 and the HST 8, whereby the power of the engine 7 is transmitted through the transmission 10 and input to the HST 8 at the first direction side thereof. The transmission mechanism of simple construction serves to shorten the overall length of the vehicle while preventing the rise of the center of gravity of the vehicle.

13 Claims, 12 Drawing Sheets

TRANSMISSION MECHANISM OF VEHICLE WITH HST

TECHNICAL FIELD

The present invention relates to transmissions for use in vehicles, such as work vehicles, having an HST (hydrostatic transmission).

BACKGROUND ART

Shortening the longitudinal length of the vehicle is demanded commonly of various work vehicles in order to diminish the turning radius, improve the ease of driving and achieve cost reductions. The same demand is made on vehicles wherein the power of an engine or like drive source is transmitted to the drive axle via an HST, especially on work vehicles which are equipped with a work device externally of the vehicle body.

However, the conventional vehicles having the HST still remain to be improved in fully meeting this demand. The problems encountered with conventional work vehicles having the HST will be described with reference to a mower tractor of the front mount type.

With reference to FIG. 12 showing the conventional work vehicle, power transmission between an HST 100 and an engine 101 arranged from the front rearward longitudinally of the body of the vehicle is effected through a pump shaft 100a projecting rearward from the HST 100 and an engine drive shaft 101a projecting forward from the engine 101 and connected to the shaft 100a by a shaft.

Since the engine 101 is installed on the vehicle body with rubber vibration isolators interposed therebetween, a vibration difference occurs between the engine 101 and the HST 100. Accordingly, to interconnect the two components by a shaft with the vibration difference absorbed, the engine drive shaft 101a is connected to the pump shaft 100a by universal joints 102. With the conventional construction, therefore, the engine 101 needs to be disposed toward the rear so as to obtain a distance L between the rear end face of the HST 100 and the front end face of the engine 101 for arranging the two universal joints in series, consequently increasing the overall length of the vehicle.

Although it is possible to install the engine above the HST to shorten the overall vehicle length, this entails the need to upwardly shift the position of the driver's seat and other members which are located above the engine, leading to impaired stability of the vehicle during driving owing to the rise of the center of gravity of the vehicle.

Especially with the work vehicle equipped with a work device 106 externally thereof among other vehicles, it is further desired that a transmission shaft 104 connecting a PTO (power take-off) shaft 103 to the input shaft 106a of the work device 106 be disposed horizontally to the great possible extent to prevent the joints of the transmission shaft 104 from giving off noise and assure the joints of improved durability.

To meet such a demand, for example JP-U No. 56555/1993 and JP-A No. 204135/1990 disclose an arrangement wherein the PTO shaft 103 is positioned below a front axle 105 and caused to project from the front end face of the front axle case (as indicated at X in FIG. 12) with use of power transmission means such as pulleys for use in work vehicles. The arrangement disclosed in these publications needs to lengthen the transmission shaft 104 (as indicated at Y in FIG. 12) if it is attempted to position the transmission shaft 104 closer to a horizontal while causing the PTO shaft 103, as positioned approximately at the same level as the engine output shaft 101a, to project from the front end of the front axle case, consequently increasing the overall vehicle length. Alternatively, the transmission shaft needs to be inclined (as indicated at Z in FIG. 12) if an attempt is made to shorten the overall vehicle length while causing the PTO shaft 103 to project from the front end of the front axle case at substantially the same level as the engine output shaft 101a, consequently impairing the durability of the transmission shaft. The arrangement disclosed is provided in view of these problems.

With the conventional construction described, a differential gear unit is provided between the engine output shaft 101a (or HST output shaft) and the PTO shaft, so that the power transmission between the two shafts must be so constructed as to clear the differential gear unit. This results in the drawback of making the power transmission complex to thereby increase the vehicle cost and impair the maintenance work efficiency.

DISCLOSURE OF THE INVENTION

An object of the present invention is to provide a transmission mechanism of simple construction for use in a work vehicle having an HST, the transmission mechanism serving to shorten the overall length of the vehicle while preventing the rise of the center of gravity of the vehicle.

Another object of the invention is to provide a transmission mechanism of simple construction for use in a work vehicle having an HST and equipped with a work device which is disposed externally of the vehicle body, the transmission mechanism serving to shorten the overall length of the vehicle while permitting a transmission shaft interconnecting a PTO shaft for driving the work device and an input shaft of the work device to be positioned close to a horizontal to the greatest possible extent.

The above objects can be fulfilled by a transmission mechanism for a vehicle having a power transmission path for transmitting power from a drive source installed in a vehicle body through an HST disposed away from the drive source toward a first direction longitudinally of the vehicle body at least to a differential gear unit for driving axles toward the first direction, the transmission mechanism being characterized in that:

a transmission is provided between the HST and the differential unit, the transmission having a casing, an input shaft connected to a drive shaft of the drive source by a shaft, and a first output shaft coupled to the differential gear unit, the input shaft extending from the casing toward a second direction opposite to the first direction, the HST comprising a hydraulic pump having a pump shaft extending into the transmission casing, and a hydraulic motor cooperative with the hydraulic pump and having a motor shaft extending into the transmission casing, the transmission comprising as housed in the casing a mechanical cooperating mechanism coupling the input shaft to the pump shaft and coupling the motor shaft to the output shaft to provide the power transmission path.

The foregoing objects can be fulfilled also by a transmission mechanism for a work vehicle including a vehicle body having one side toward a first direction along the length thereof and the other side toward a second direction opposite to the first direction, the work vehicle comprising a differential gear unit for driving axles positioned toward the first direction, an HST and a drive source which are arranged in the vehicle body from the first direction side toward the second direction, the work vehicle being equipped with a work device positioned toward the first direction externally thereof, the transmission mechanism having a travel power transmission path for transmitting power from the drive source to the differential gear unit through the HST, and a PTO power transmission path for dividedly transmitting power from the travel power transmission path to a PTO shaft for driving the work device, the transmission mechanism being characterized in that;

a transmission is provided between the differential gear unit and the HST, the transmission comprising a casing, an input shaft for receiving the power from the drive source, and a first output shaft coupled to the differential gear unit, the casing having a main portion facing the differential gear unit and an extension extending from the main portion toward one side of the vehicle body widthwise thereof, the PTO shaft projecting from the transmission extension toward the first direction and positioned outwardly of the differential gear unit toward one side of the vehicle widthwise thereof, the transmission casing having housed therein a travel cooperating mechanism and a PTO cooperating mechanism providing the travel power transmission path and the PTO power transmission path respectively.

BEST MODE OF CARRYING OUT THE INVENTION

Embodiment 1

Figure 1:
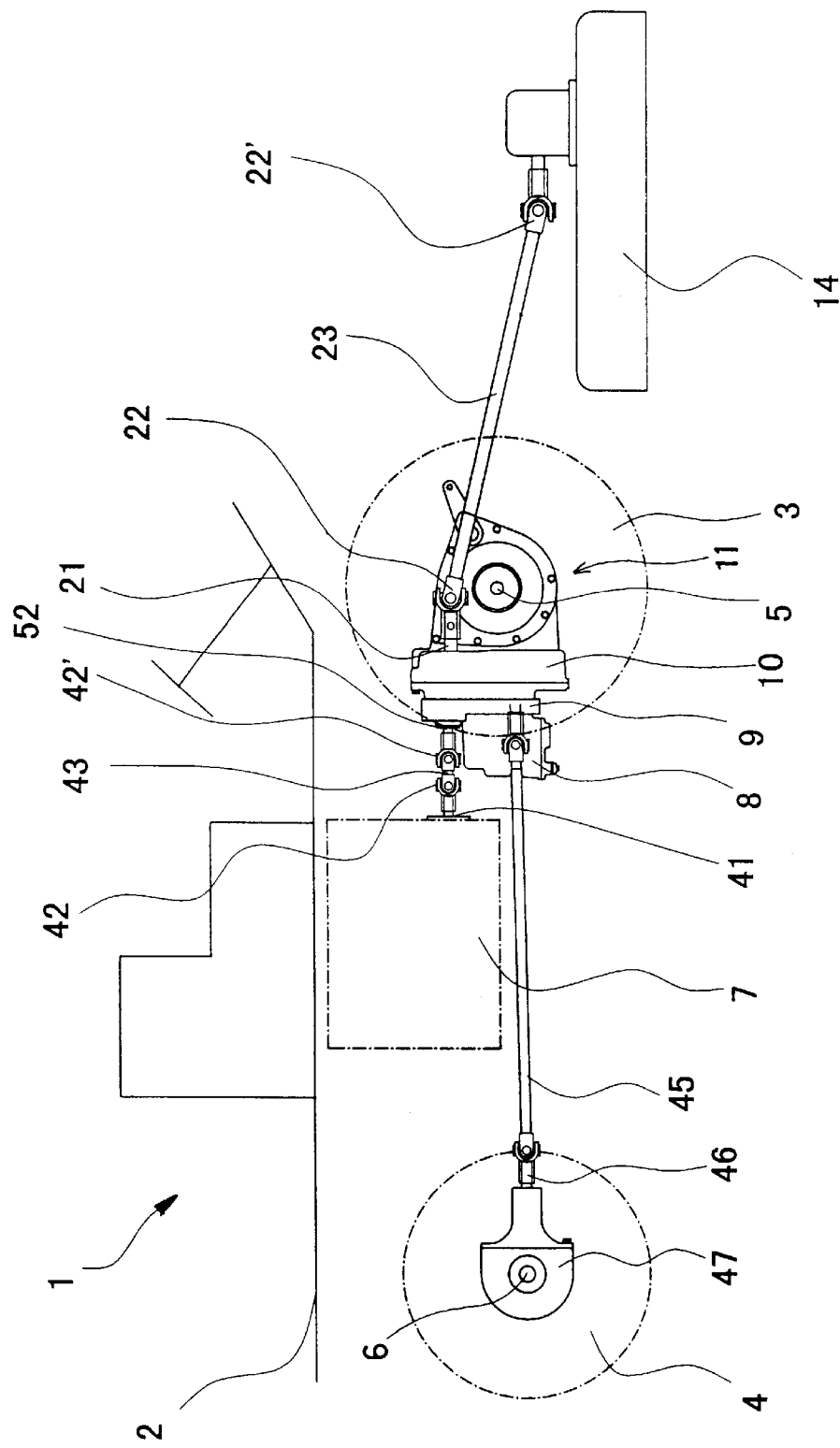
FIG. 1 is a side elevation schematically showing a front mount mower tractor incorporating a first embodiment of transmission mechanism of the invention.
Figure 2:
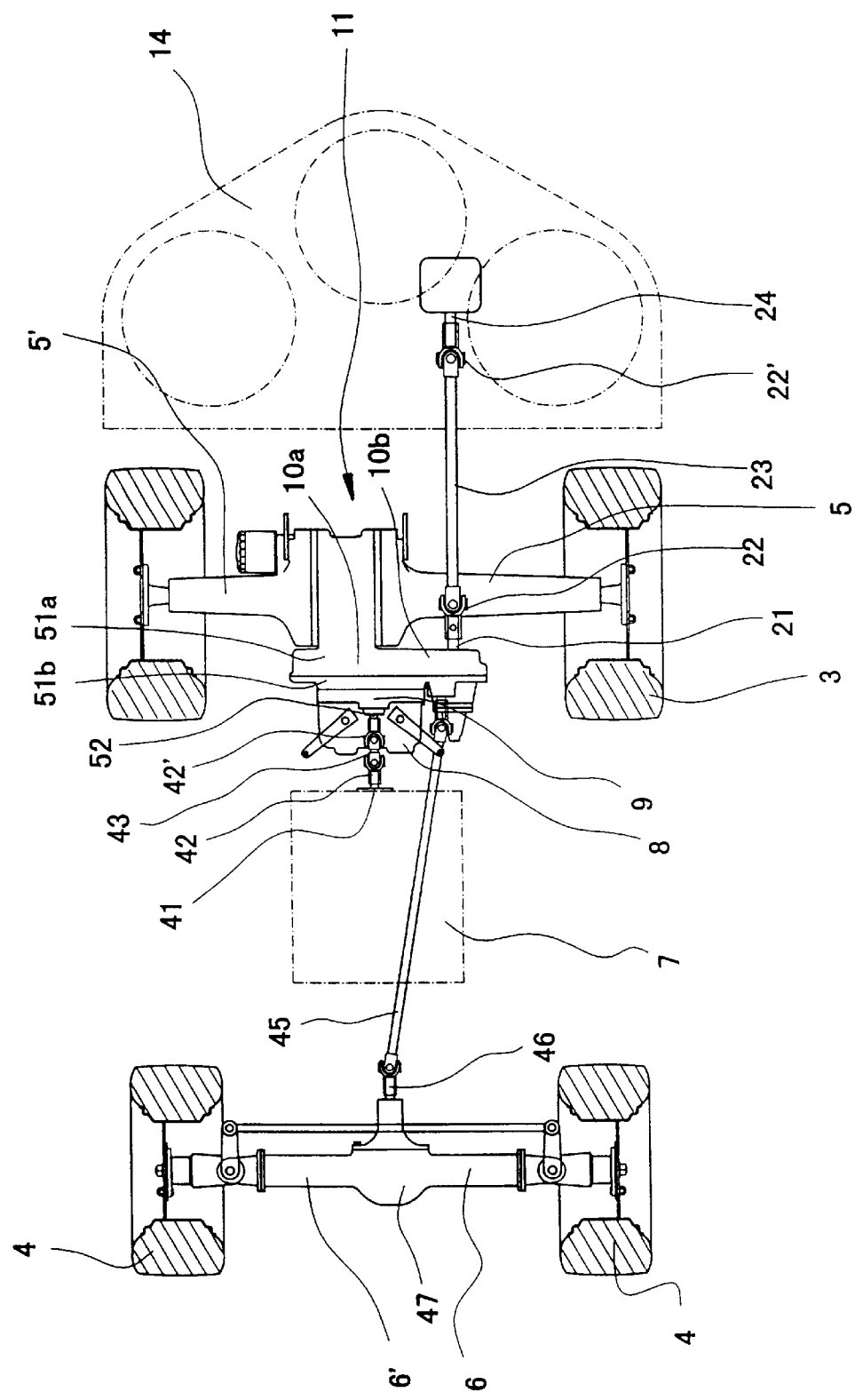
FIG. 2 is a schematic plan view of the mower tractor shown in FIG. 1.
Figure 3:
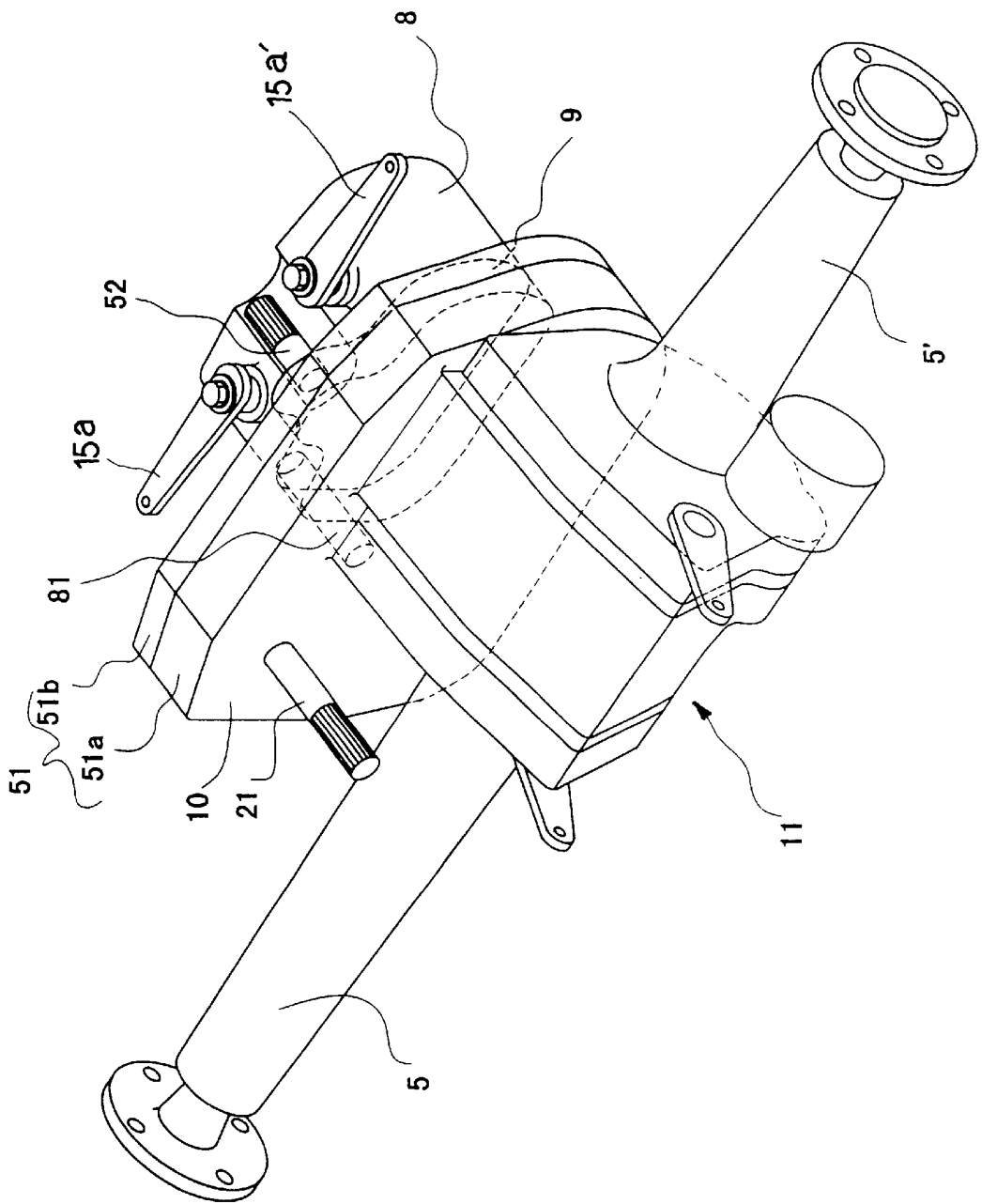
FIG. 3 is a perspective view of the transmission mechanism of the mower tractor shown in FIG. 1.
Figure 4:
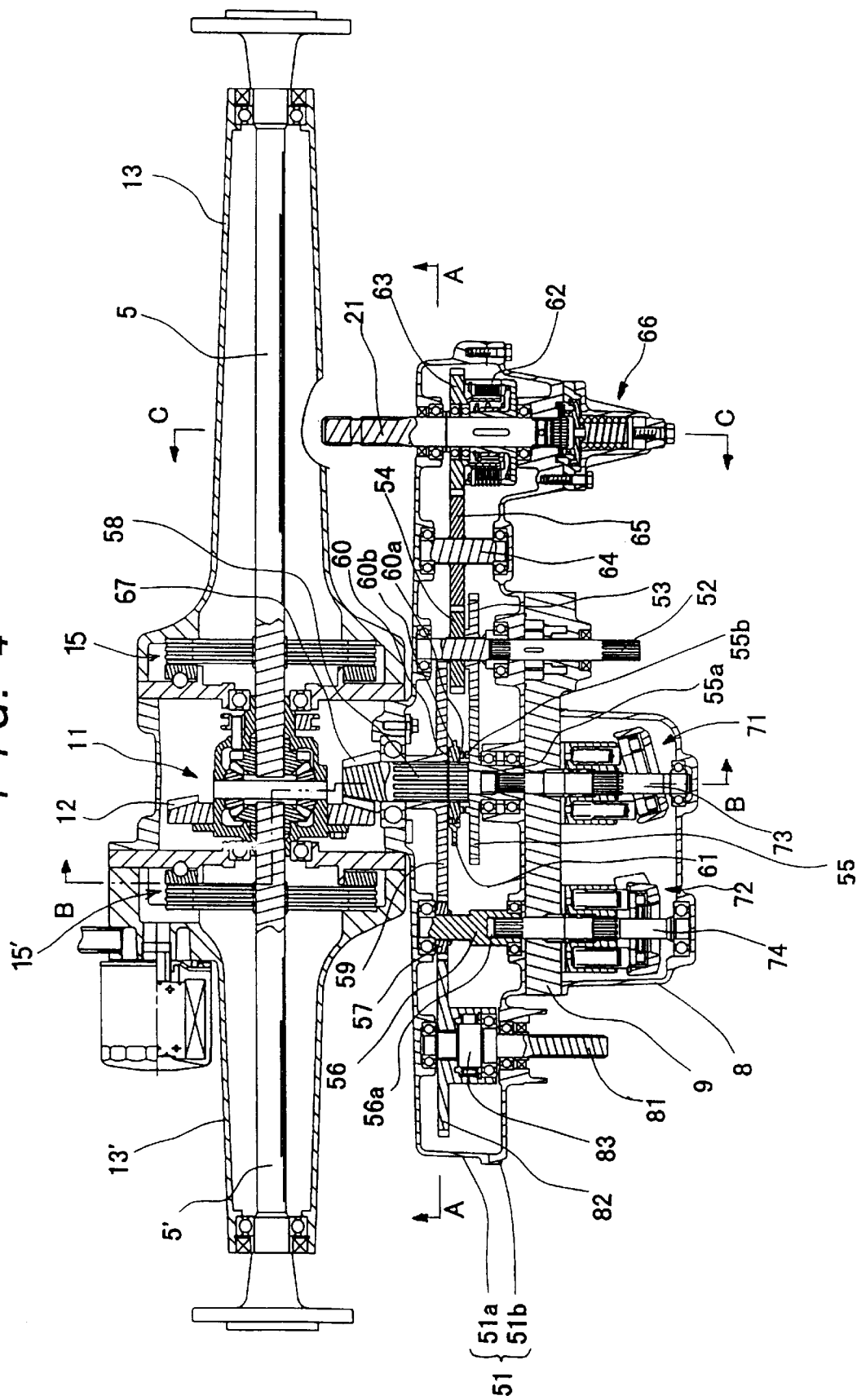
FIG. 4 is a sectional plan view in development of the first embodiment of transmission mechanism of the invention.
Figure 5:
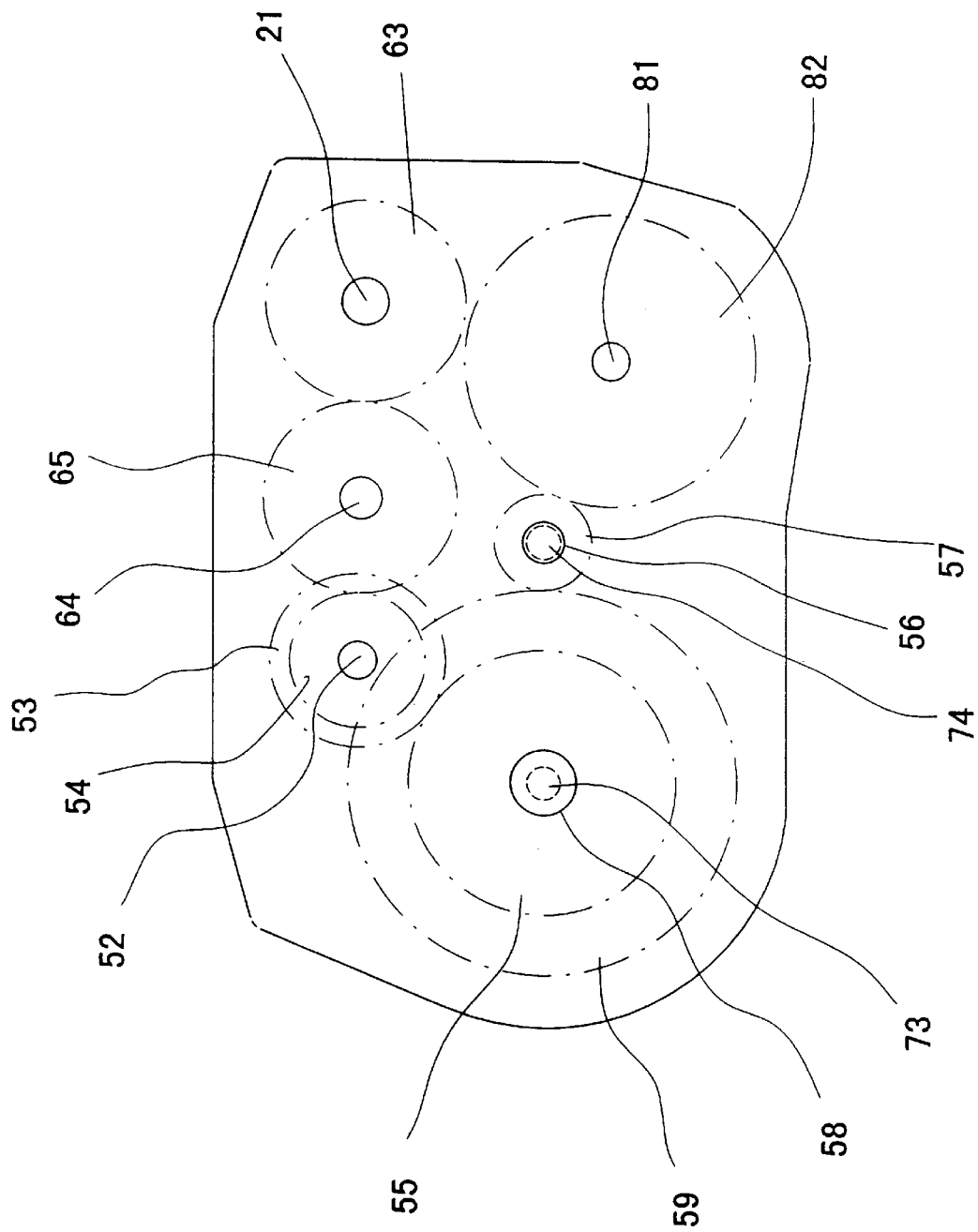
FIG. 5 is a view in section taken along the line A—A in FIG. 4.
Figure 7:
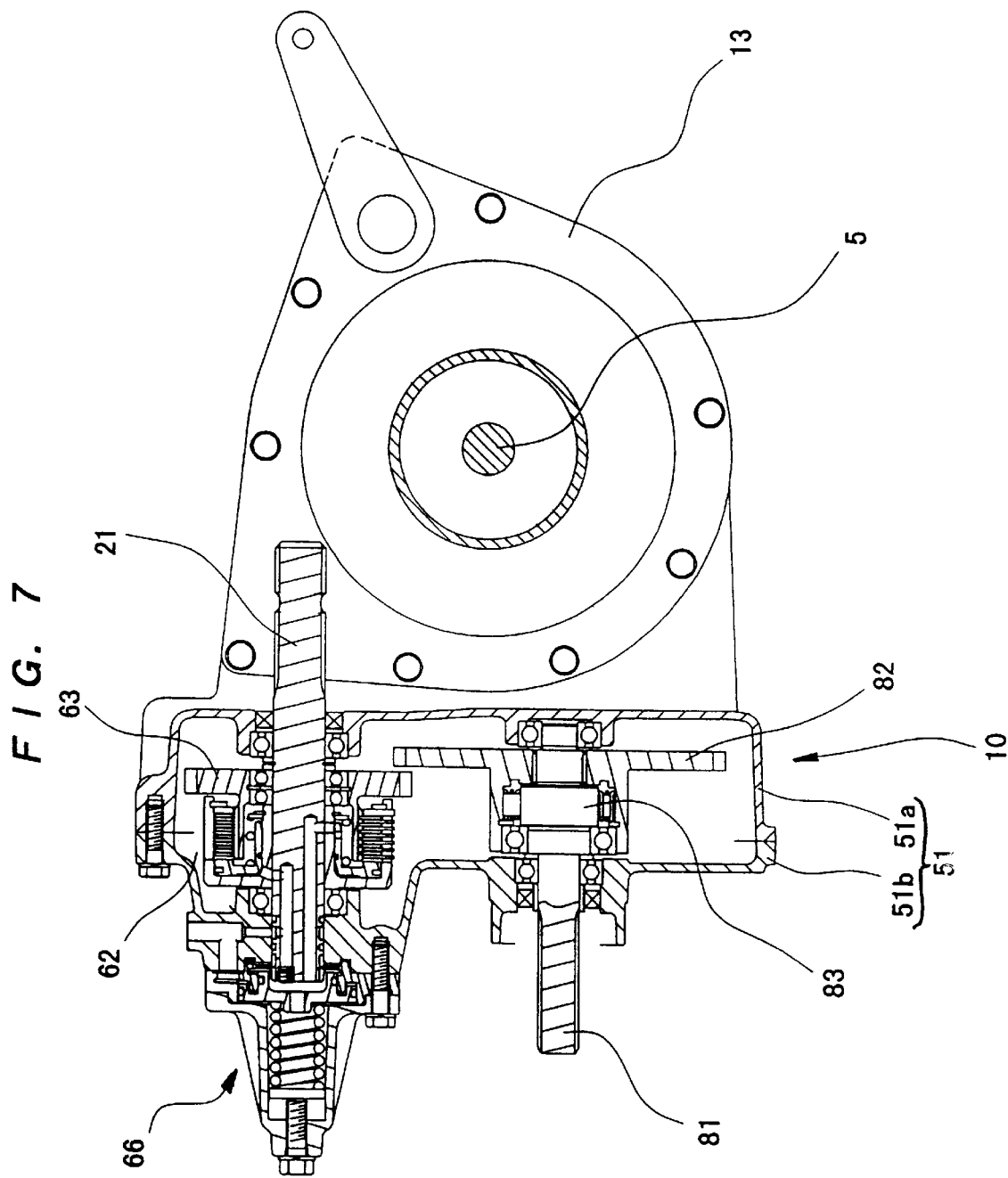
FIG. 7 is a view in section taken along the line C—C in FIG. 4.

A preferred embodiment of transmission mechanism of the present invention will be described below with reference to the accompanying drawings concerned. FIGS. 1 and 2 are a schematic side elevation and a schematic plan view, respectively, of a front mount mower tractor incorporating the transmission mechanism according to the embodiment. FIG. 3 is a perspective view of the transmission mechanism in the mower tractor. FIG. 4 is a plan view in section and in development of the transmission mechanism according to the embodiment. FIGS. 5 and 7 are views in sections taken respectively along the line A—A, line B—B and line C—C in FIG. 4.

Referring to FIGS. 1 and 2, the mower tractor 1 according to the present embodiment comprises a vehicle body 2 having one side toward a first direction along the length thereof and the other side toward a second direction opposite to the first direction, a pair of opposite nonsteerable wheels 3, 3 and a pair of opposite steerable wheels 4, 4 which are arranged respectively at the first direction side and the second direction side of the vehicle body 2, a pair of opposite axles 5, 5' toward the first direction and a pair of opposite axles 6, 6' toward the second direction for supporting the wheels 3, 3 and 4, 4, respectively, and also supporting the vehicle body 2, and a front mower 14 supported by the vehicle body 2 and positioned externally of the first direction side thereof. In the following description of the embodiment, the first direction side and the second direction side will be referred to as the front side and the rear side, respectively.

An engine 7 serving as a drive source and positioned between the front wheels 3 and the rear wheels 4 is mounted on the vehicle body 2, with rubber vibration isolators (not shown) provided therebetween. Also mounted on the vehicle body 2 are an HST 8 for receiving the output of the engine to effect speed changes, a center section 9 formed with an oil channel for the HST 8, and a mechanical transmission 10 for receiving an output from the HST 8, these components being arranged forward in this order as positioned to the front of the engine 7. Further disposed in front of the transmission 10 is a differential gear unit 11 (see FIG. 2) for receiving an output from the transmission 10 and delivering the power to the pair of front axles 5, 5'. Thus, the differential gear unit 11, transmission 10, HST 8 and engine 7 are arranged in this order from the front side of the vehicle body rearward, as positioned in the approximate midportion of the width of the vehicle body.

As shown in FIG. 2, the transmission 10 has a main portion 10a facing the differential gear unit 11, and an extension 10b extending from the main portion 10a toward one side of the vehicle body widthwise thereof. Projecting forward from the front side of the extension 10b is a PTO shaft 21 for driving the mower. The PTO shaft 21 is coupled to a mower input shaft 24 by universal joints 22, 22' and a transmission shaft 23. Projecting rearward from the rear side of the extension 10b is an output shaft 81 for driving the rear wheels as seen in FIGS. 3, 4 and 7.

A description will now be given of the transmission mechanism included in the mower tractor thus constructed for transmitting power from the engine 7 to the HST 8. As shown in FIGS. 1 and 2, the engine 7 has a drive shaft, i.e., an engine output shaft 41, projecting therefrom forward horizontally and having a front end connected to a transmission shaft 43 by a universal joint 42.

With reference to FIGS. 3 and 4, the transmission 10 comprises a casing 51 having a front casing member 51a and a rear casing member 51b, and a transmission input shaft 52 having a front end supported by a bearing on the front casing member 51a and a rear end projecting rearward from the rear casing member 51b. The input shaft 52 has approximately the same axis as the engine output shaft 41 and a rear end connected to the transmission shaft 43 (see FIGS. 1 and 2) by a universal joint 42'. Inside the casing 51, a first gear 53 and a fifth gear 54 are mounted on the input shaft 52 nonrotatably relative thereto.

The HST 8 has a hydraulic pump 71 and a hydraulic motor 72, such that the rotation of a pump shaft 73 can be delivered, as subjected to a desired speed change, to a motor shaft 74. The pump shaft 73 and the motor shaft 74 extend in parallel to each other longitudinally of the vehicle body and are preferably so arranged that a plane through the axes of the two shafts will be approximately horizontal as seen in FIG. 4. This arrangement serves to reduce the height of the HST 8, thereby lowering the position of the seat and other members to be installed on the vehicle body above the HST 8 to position the center of gravity of the vehicle at a lower level. As seen in FIG. 4, the pump shaft 73 and the motor shaft 74 have front end portions projecting forward from the HST 8 into the transmission casing 51 through the center section 9.

A second gear 55 is supported on the portion of the pump shaft 73 inside the casing 51 nonrotatably relative to the shaft 73. The gear 55 is in mesh with the first gear 53 on the input shaft 52. Thus according to the present embodiment, the input shaft 52, the first gear 53 nonrotatably supported on the input shaft 52 and the second gear 55 nonrotatably supported on the pump shaft 73 and meshing with the gear 53 provide a first mechanical cooperating mechanism for transmitting the engine output, as delivered via the universal joints 42, 42' and the transmission shaft 43, therethrough to the HST 8.

According to the present embodiment, the engine output shaft 41 is coupled to the transmission input shaft 52 which is positioned forwardly of the HST 8, and the input shaft 52 is coupled to the forwardly projecting HST pump shaft 73 by the first and second gears 53, 55 to input the power of the engine 7 to the HST 8 from the front. This results in the following advantage.

In the conventional construction wherein the pump shaft projects rearward and is connected to the engine output shaft by universal joints and a transmission shaft, two universal joints need to be arranged between the rear wall of the HST and the front wall of the engine since the engine is mounted with use of rubber vibration isolators, hence the necessity of disposing the engine as rearwardly spaced apart from the HST by a predetermined distance. The conventional construction therefore has the drawback of increasing the overall length of the vehicle itself.

According to the present embodiment, on the other hand, the power is transmitted from the engine 7 to the HST 8 at the front side thereof, i.e., by way of the first cooperating mechanism in the transmission 10 positioned to the front of the HST, so that despite the use of two universal joints, the engine 7 can be positioned close to the HST 8, whereby the overall length of the vehicle can be shortened.

Next, the transmission mechanism for transmitting power from the HST 8 to the differential gear unit 11 will be described. As previously stated, the motor shaft 74 has its front end portion projected forward into the transmission casing 51. An intermediate shaft 56 is supported by the casing 51 coaxially with the motor shaft 74 and formed with a center bore 56a extending from its rear end axially thereof. The front end portion of the motor shaft 74 extends into the center bore 56a of the intermediate shaft 56, is splined to the shaft 56 and is not rotatable about the axis relative thereto. The intermediate shaft 56 thus splined to the motor shaft 74 forms a portion of the shaft 74.

Figure 6:
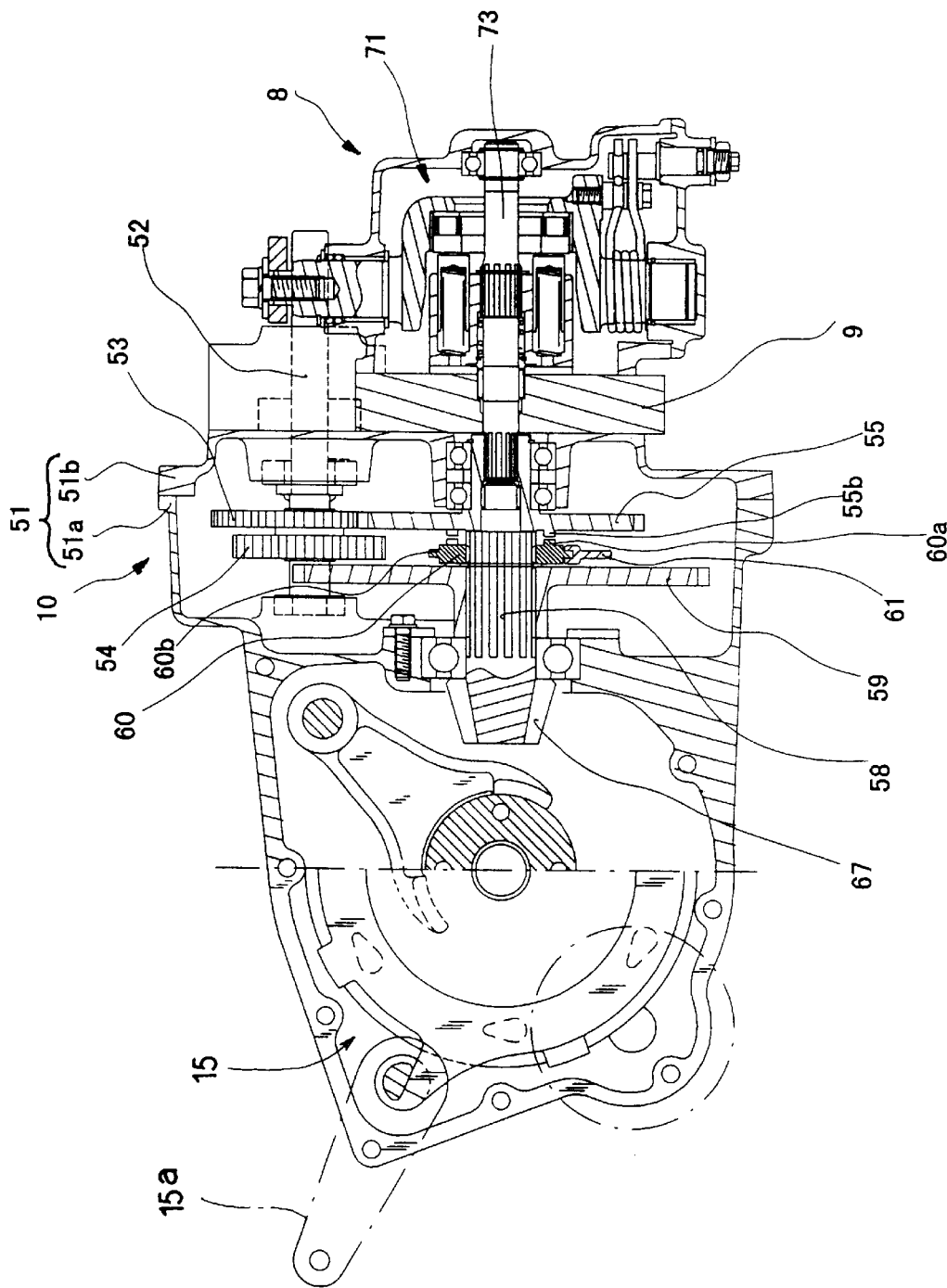
FIG. 6 is a view in section taken along the line B—B in FIG. 4.

The intermediate shaft 56 partly forming the motor haft 74 has a third gear 57 mounted thereon nonrotatably relative thereto. The gear 57 is in mesh with a fourth gear 59 supported on a first output shaft 58 of the transmission 10 at the approximate axial midportion of the shaft 58 nonrotatably relative thereto. As shown in FIGS. 4 and 6, the first output shaft 58 has a forward portion rotatably supported by the front casing member 51a, and a rear end extending into a center bore 55a formed in a second gear 55 on the pump shaft 73 and supported by the gear rotatably relative thereto. The output shaft 58 has a front end projecting forward from the casing 51 into front axle cases 13, 13'. An output gear 67 is mounted on the projecting portion of the output shaft 58. The output gear 67 is in mesh with an input gear 12 of the differential gear unit 11. The front axle cases 13, 131 covering the respective front axles 5, 5' projecting rightward and leftward from the gear unit 11 have housed therein disk brake devices 15, 15' for braking the front axles 5, 5', respectively. Indicated at 15a, 15a' in FIG. 3 are operating arms for the devices. These arms are connected to respective right and left brake pedals (not shown) provided on the vehicle.

According to the present embodiment, the foregoing components of the transmission 10, i.e., the intermediate shaft 56 joined to the motor shaft 74 nonrotatably relative thereto about the axis, the third gear 57 nonrotatably supported by the intermediate shaft 56, the fourth gear 59 meshing with the gear 57, the first output shaft 58 nonrotatably supporting the gear 59 thereon, and the output gear 67 mounted on the front end of the output shaft 58 provide a second mechanical cooperating mechanism for transmitting power from the motor shaft 74 to the differential gear unit 11.

Further with reference to FIGS. 4 and 6, the first output shaft 58 is provided, at a portion thereof rearward from a third gear 57, with an annular coupling member 60 supported on the shaft 58 nonrotatably relative thereto and slidable axially thereof. The coupling member 60 has an engaging portion 60a formed on the rear end face thereof (opposed to the second gear 55 on the pump shaft 73), and an annular ridge 60b projecting radially outward from its outer periphery. A shifter 61 (see FIGS. 4 and 6) is engaged at one end thereof with the annular ridge 60b of the coupling member 60. The other end (not shown) of the shifter 61 extends outward from the transmission casing 51. The coupling member 60 is slidable on the first output shaft 58 by moving the other end of the shifter 61. The second gear 55 on the pump shaft 73 has an engaging portion 55b formed on the front end face thereof (opposed to the coupling member 60) and engageable with the engaging portion 60a of the coupling member 60. Accordingly, the coupling member 60 can be joined to and made rotatable with the gear 55 by slidingly moving the coupling member 60 with the shifter 61 and bringing the engaging portion 60a of the coupling member into engagement with the engaging portion 55b of the gear 55.

Thus, the coupling member 60 is provided on the first output shaft 58 so as to be rotatable with the second gear 55 on the pump shaft 73, with the first output shaft 58 made to have approximately the same axis as the pump shaft 73, with the result that even if the HST 8 malfunctions, power can be transmitted from the engine 7 to the front axles 5, 5'. In the event of the HST 8 malfunctioning, consequently blocking the power transmission path for travel and rendering the vehicle unable to travel, an emergency power transmission path for travel is made available which comprises the transmission input shaft 52, first gear 53, second gear 55, coupling member 60 and transmission first output shaft 58, by operating the shifter 61 and joining the coupling member 60 to the second gear 55. Accordingly, even if the HST 8 should develop trouble, the mower tractor of the present embodiment need not be transported to a repair factory by man power or tow vehicle but can be driven using the emergency power transmission path for travel.

Next, a description will be given of power transmission from the transmission input shaft 52 to the PTO shaft 21. With reference to FIG. 7, the PTO shaft 21 is supported along the length of the vehicle body by the front casing member 51a and the rear casing member 51b so that the shaft front end projects forward from the transmission extension 10b (see FIG. 2). A sixth gear 63 is supported by a clutch member 62 on the PTO shaft 21. The gear 63 is in mesh with the fifth gear 54 on the transmission input shaft 52 via an idle gear 65 on an idle shaft 64 (see FIG. 4). Thus, the fifth gear 54 on the input shaft 52, idle gear 65 in mesh with the gear 54, idle shaft 64 supporting the idle gear 65, sixth gear 63 meshing with the idle gear 65 and clutch member 62 provide a PTO cooperating mechanism for transmitting power from the input shaft 52 to the PTO shaft 21.

With the present embodiment, a brake member 66 operatively connected to the clutch member 62 is provided on the rear end of the PTO shaft 21 as seen in FIGS. 4 and 7. The brake is released when the clutch is engaged, while the brake is conversely actuated when the clutch is disengaged. The brake member 66 thus provided makes it possible to stop the rotation of the mower against the force of inertia simultaneously when the drive force to be delivered to the mower is blocked.

Figure 12:
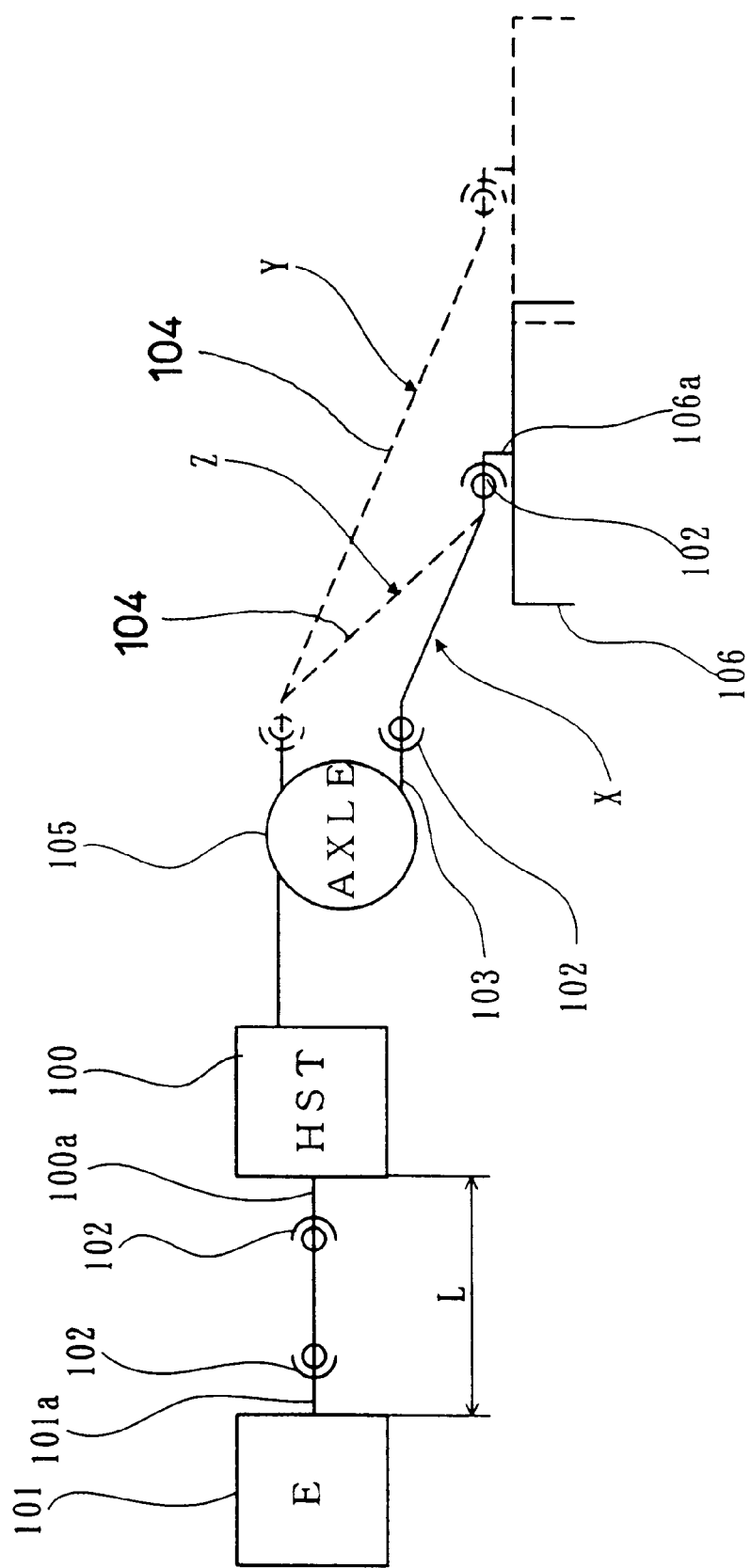
FIG. 12 is a schematic side elevation showing a conventional front mount mower tractor.

With the present embodiment, the PTO shaft 21 is caused to project from the transmission extension 10b as described above. This results in the following advantage. When the PTO shaft as positioned above the front axle is projected forward from the front axle case, with the front end of the front mower at the same distance from the PTO shaft as in the present embodiment, the transmission shaft interconnecting the PTO shaft and the mower input shaft has an increased inclination (as indicated at Z in FIG. 12). The increased inclination of the transmission shaft impairs the durability of the transmission shaft and increases the noise to be produced when the mower is raised or lowered. On the other hand, an attempt to cause the PTO shaft to project forward from the front axle case at a position lower than the front axle (as indicated at X in FIG. 12) decreases the inclination of the transmission shaft but requires a complex PTO cooperating mechanism for dividedly delivering power from the travel power transmission path and transmitting the power to the PTO shaft, entailing an increased cost and an impaired maintenance efficiency.

With the present invention, on the other hand, the transmission 10 positioned to the rear of the front axles 5, 5' has the extension 10b extending toward one side widthwise of the vehicle from the main portion 10a facing the differential gear unit 11, and the PTO shaft 21 is caused to project from and supported by the extension 10b. The PTO cooperating mechanism for deriving power from the travel power transmission path and transmitting the power to the PTO shaft 10 can then be provided by a simple construction as incorporated in the transmission 10, while the inclination of the transmission shaft 23 can be diminished by positioning the PTO shaft 21 to the rear of the front axles 5, 5'. As a result, the mower tractor wherein the front mower 14 is installed at a reduced distance from the front axles 5, 5' is made available at a lower cost without entailing the drawback of impaired durability or increased noise due to the inclination of the transmission shaft 23.

The transmission mechanism for the rear wheels 4, 4' will be described next. With reference to FIGS. 4 and 7, the transmission extension 10b has the aforementioned rear wheel driving output shaft 81 projecting from a lower portion of the rear end thereof. The output shaft 81 is supported by the front and rear casing members 51a, 51b so as to extend longitudinally of the vehicle body. The output shaft 81 has a seventh gear 82 supported thereon nonrotatably within the casing 51. A clutch 83 is interposed between the output shaft 81 and the seventh gear 82. The gear 82 is in mesh with the third gear 57 supported on the intermediate shaft 56 of the transmission nonrotatably relative thereto. Thus, the motor shaft 74, third gear 57 nonrotatably supported by the motor shaft 74, seventh gear 82 meshing with the gear 57, rear wheel driving second output shaft 81 supporting the gear 82 and clutch 83 provided between the output shaft 81 and the seventh gear 82 provide a third mechanical cooperating mechanism for power transmission to the rear wheels 4, 4'. As seen in FIG. 1, the rear end of the second output shaft 81 is connected by a universal joint to a propeller shaft 45 disposed below the engine 7. The propeller shaft 45 is connected to an input shaft 46 of a rear axle case 47 by a universal joint to transmit power to the rear axles 6.

With the present embodiment, the clutch 83 is interposed between the second output shaft 81 and the seventh gear 82 so as to transmit the drive force to the rear wheels 4, 4' only when the rear wheels 4, 4' are subjected to a load in excess of a predetermined value due, for example, to a skid of the front wheels 3, 3' and to thereby prevent the terrain from becoming rough owing to a skid of the rear wheels 4, 4'. If the four wheels are driven at all times, the steerable wheels, i.e., the rear wheels 4, 4', will skid to rough the terrain owing to the difference in turning radius between the front wheel and the rear wheel during turns of the vehicle. In contrast, the clutch 83 provided obviates this drawback, enabling the rear wheels to drive the vehicle in the event of the front wheels skidding.

In a front mount mower tractor thus embodying the present invention and comprising front axles 5, 5', transmission 10, HST 8 and engine 7 which are arranged from the front of the vehicle body rearward in the order mentioned, power transmission from the engine 7 to the HST 8 is effected from the front of the HST 8 through a mechanical first cooperating mechanism provided in the transmission 10 as described above, so that the engine 7 can be positioned closer to the HST 8, consequently shortening the overall length of the vehicle.

The transmission 10 includes an extension 10b extending toward one side widthwise of the vehicle body and having a PTO shaft 21 projecting from the front side of the extension. This also serves to shorten the overall length of the vehicle while permitting a transmission shaft 23 connecting the PTO shaft 21 to a mower input shaft 24 to be positioned close to a horizontal, consequently making it possible to provide a mower tractor of simple construction at a reduced cost.

Embodiment 2

Figure 8:
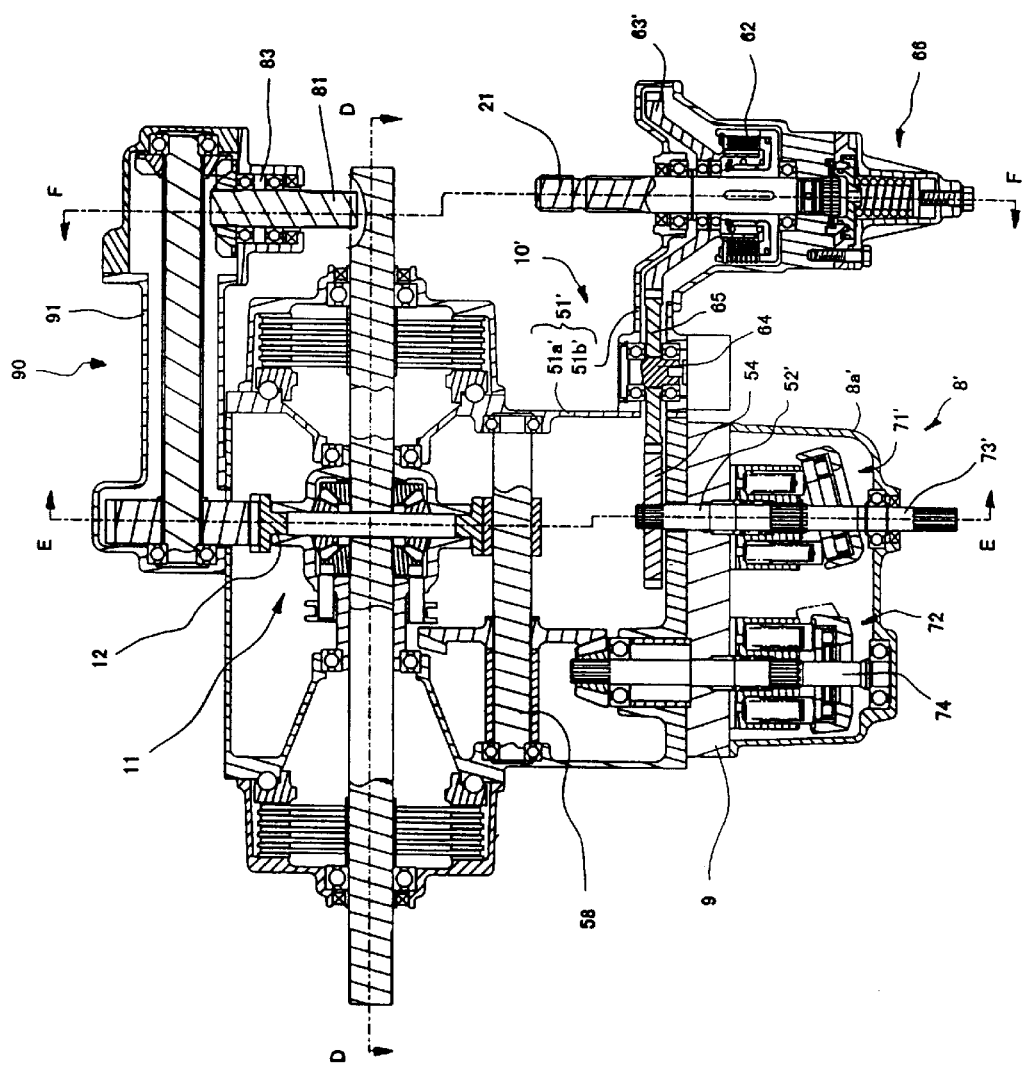
FIG. 8 is a sectional plan view in development of a second embodiment of transmission mechanism of the invention.
Figure 9:
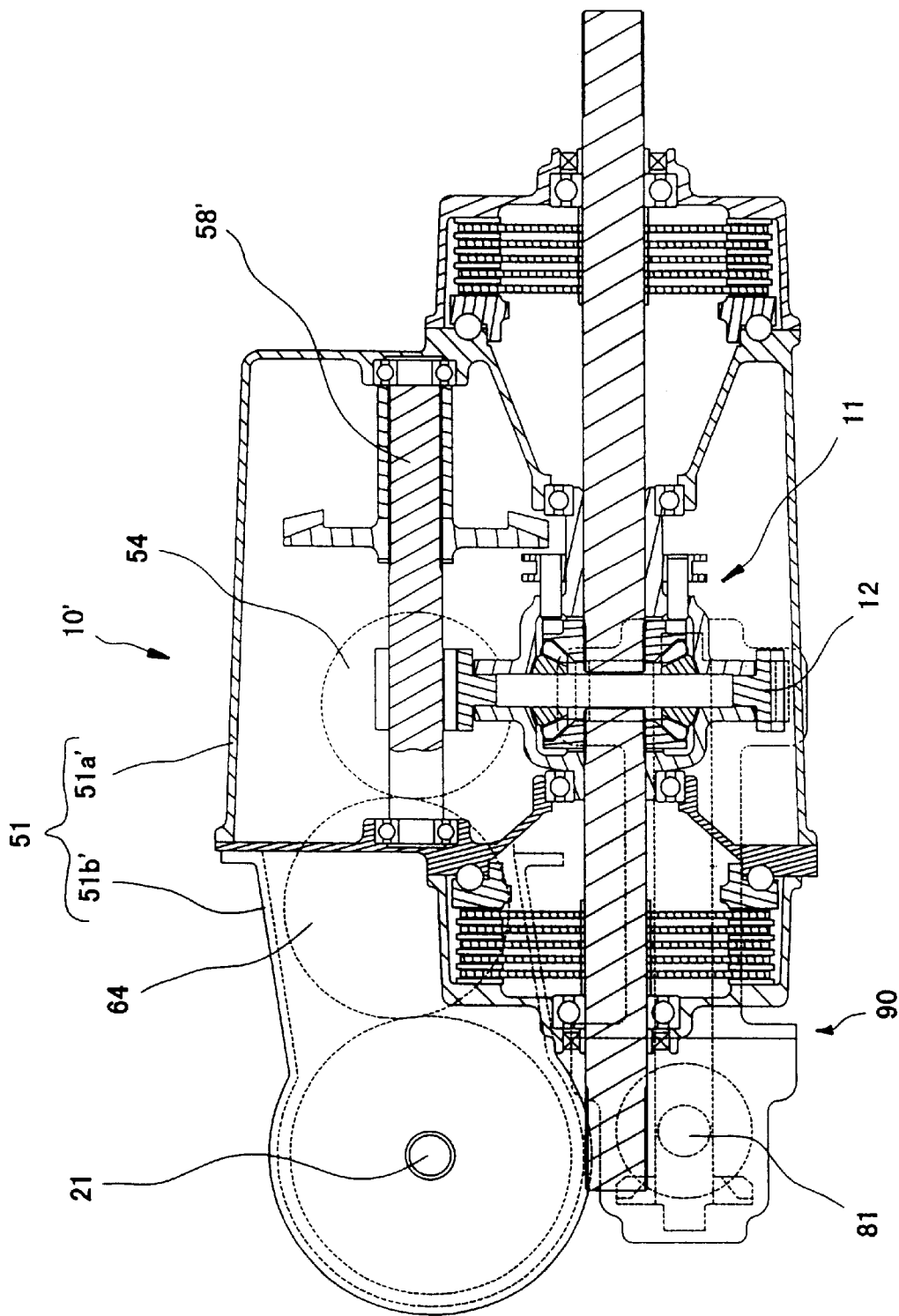
FIG. 9 is a view in section taken along the line D—D in FIG. 8.
Figure 10:
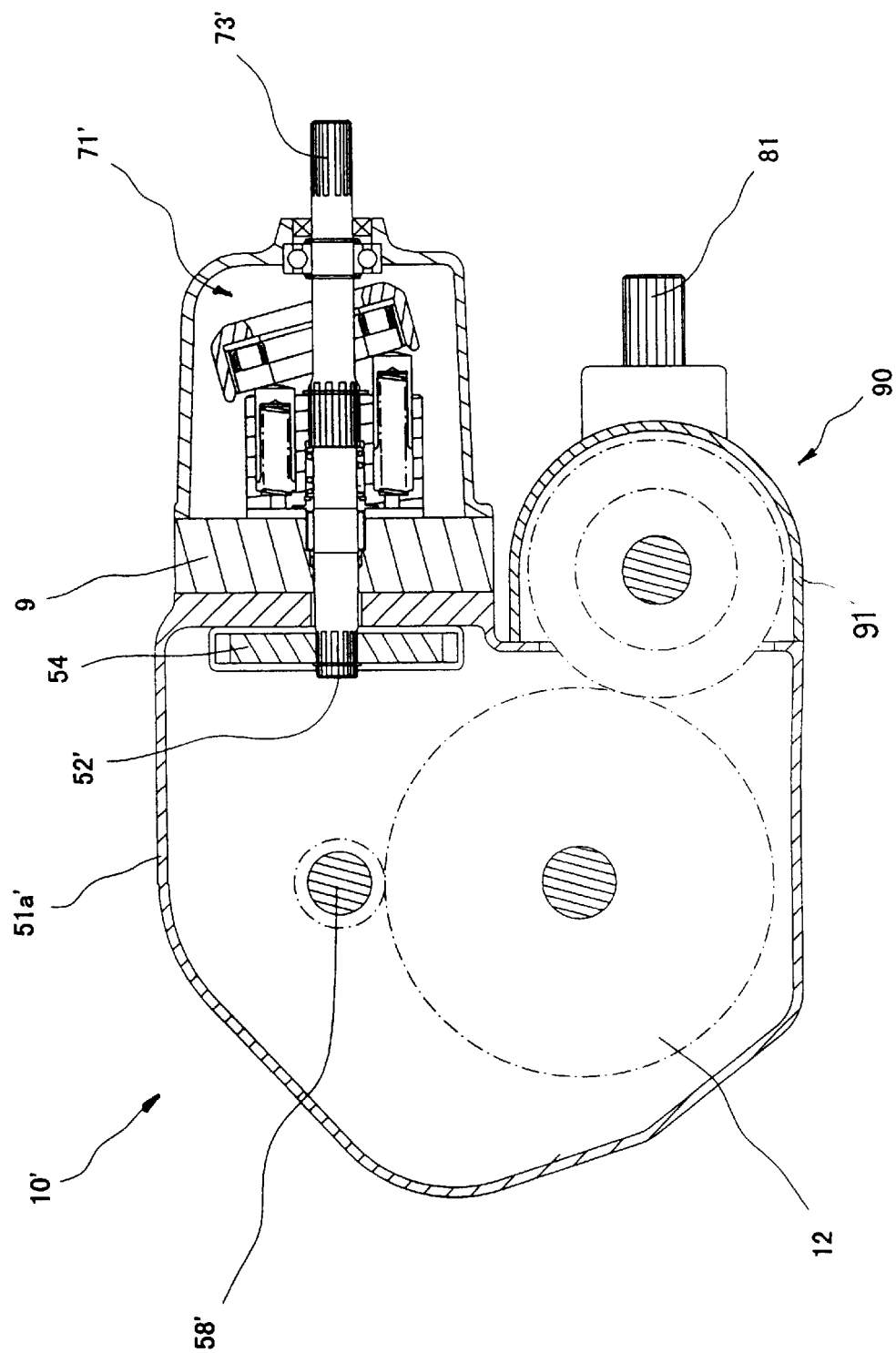
FIG. 10 is a view in section taken along the line E—E in FIG. 8.
Figure 11:
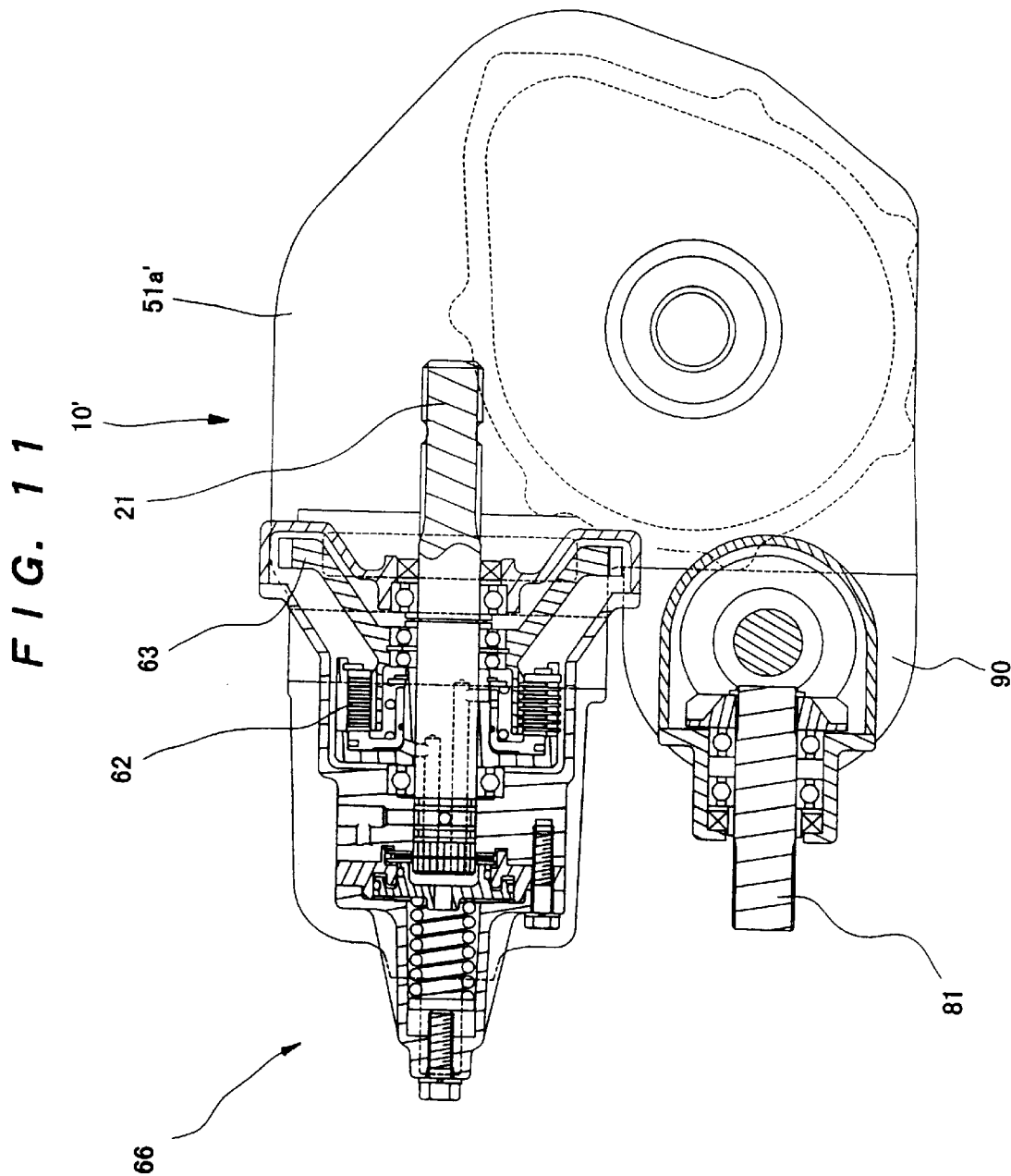
FIG. 11 is a view in section taken along the line F—F in FIG. 8.

A second embodiment of transmission mechanism of the invention will be described below with reference to the accompanying drawings concerned. FIG. 8 is a plan view in section and development showing the transmission mechanism according to the present embodiment. FIGS. 9 to 11 are views in sections taken respectively along the line D—D, line E—E and line F—F in FIG. 8. Like the foregoing embodiment, the present embodiment will be described with reference to a front mount mower tractor which is equipped with a mower as positioned outwardly of the front side of the vehicle body and in which a differential gear unit 11 for driving front axles 5, HST 8' and drive source (not shown) are arranged from the front rearward in the order mentioned.

Throughout the drawings showing the first and second embodiments, like parts are designated by like reference numerals and will not be described repeatedly.

Referring to FIGS. 8 to 11, a transmission 10' is provided between the differential gear unit 11 and the HST 8'. The transmission 10' has a casing 51'. The casing 51' comprises a main portion 51a' located in approximately the same position as the differential gear unit 11 with respect to the widthwise direction of the vehicle body and housing the gear unit 11, and an extension 51b' extending from the main portion 51a' toward one side widthwise of the vehicle body so as to be clear of the unit 11 and separable from the main portion 51a'. The transmission 10' further has a first output shaft 58' coupled to the gear unit 11.

The HST 8' comprises a hydraulic pump 71' including a pump shaft 73' which has a rear end portion extending rearward from an HST casing 8a' and connected to an engine output shaft 41 (see FIG. 1) by a shaft, and a hydraulic motor 72 cooperative with the hydraulic pump 71' and including a motor shaft 74 which has a front end portion extending into the main portion 51a' of the transmission casing. The pump shaft 73' has a front end portion extending into the main portion 51a' of the transmission casing and serves also as a transmission input shaft 52' for inputting the power from the engine 7 to the transmission 10'.

The transmission casing extension 51b' is provided with a PTO shaft 21 having a front end portion extending forward. The PTO shaft 21 is coupled to the transmission input shaft 52' by a PTO cooperating mechanism comprising gears and housed in the transmission casing 51.

The front end portion of the motor shaft 74 is coupled to an input gear 12 of the differential gear unit 11 by a travel cooperating mechanism comprising gears and housed in the transmission casing main portion 51a'.

As shown in FIGS. 9 to 11, a rear wheel driving unit 90 is attached to the rear wall lower portion of the transmission casing main portion 51a'. The unit 90 has a casing 91, a rear wheel driving second output shaft 81 projecting from the casing 91 to extend rearward at its rear end portion, and a clutch 83. The second output shaft 81 is coupled to the input gear 12 of the differential gear unit 11 by a rear wheel driving cooperating mechanism comprising gears and housed in the casing 91.

The transmission mechanism thus constructed has the advantage of shortening the overall length of the vehicle while permitting a transmission shaft 23 connecting the PTO shaft 21 to the input shaft of the mower 14 to be positioned close to a horizontal like the first embodiment described. The transmission mechanism further has the following advantage.

The transmission casing extension 51b' for supporting the PTO shaft 21 is made removable from the main portion 51a'. This permits use of parts for vehicles which need not have the PTO shaft 21 and for the present vehicle in common. The transmission having the main portion 51a' only is prepared as a common component, and when there arises a need to take off power for the work vehicle, a PTO unit having the extension 51b', PTO cooperating mechanism, clutch member 62 and brake member 66 can be additionally attached to the common component. Use of common parts also readily permits alterations in the specifications of the vehicle, as when the PTO shaft 21 is to be projected rearward.

Further according to the present embodiment, the rear wheel driving unit 90 can be additionally attached to the transmission casing main portion 51a', so that common parts are also usable for the main portion.

Further according to the present embodiment, the differential gear unit 11 is adapted to be housed in the transmission main portion 51a'. For example due to a reduction in material cost, this renders the present embodiment less costly than the first embodiment wherein the gear unit has a separate casing.

Although the invention has been described above with reference to front mount mower tractors as embodiments, the invention is not limited to vehicles of this type but is applicable to various work vehicles which are provided with a work device externally of the front or rear side of the vehicle body.

The cooperating mechanisms of the foregoing embodiments comprise gears, whereas the invention is not limited to mechanisms of this type; various mechanical cooperating mechanisms are usable which include, for examples, chains.

According to the embodiments described, the differential gear unit 11, main portion of the transmission 10 or 10', HST 8 or 8' and engine 7 are arranged in the approximate midportion of width of the vehicle body in view of the balance of the vehicle, but the invention is not limited to this arrangement. Insofar as these components are arranged in this order longitudinally of the vehicle body, the components can be arranged at different positions with respect to the widthwise direction of the vehicle body.

The vehicle comprising the transmission mechanism of the invention has a differential gear unit, an HST and a drive source which are arranged in the vehicle body from one side thereof closer to a first direction along the length thereof toward the other side in a second direction opposite to the first direction. A transmission is provided between the differential gear unit and the HST to transmit the power of the drive source through the transmission to the HST from the first direction. The power source can therefore be positioned close to the HST to shorten the overall length of the vehicle.

When the drive shaft of the drive source and the input shaft of the transmission are arranged on the same axis, the distance between the drive source and the HST can be further shortened.

When the pump shaft of the HST and the motor shaft thereof are arranged in approximately the same horizontal plane, the HST can be diminished in height, whereby the center of gravity of the vehicle can be lowered.

When the transmission output shaft and the HST pump shaft are arranged approximately on the same axis and butted against each other, and further when a coupling member which can be joined to and is rotatable with the pump shaft is mounted on the output shaft slidably axially thereof, a power transmission path for use in travel in an emergency can be provided even if the HST malfunctions.

The present invention further provides a transmission mechanism for use in a work vehicle having a travel power transmission path for transmitting power from a drive source to a differential gear unit for driving axles toward a first direction by way of an HST, and a PTO power transmission path for dividedly transmitting power from the travel power transmission path to a PTO shaft for driving a work device, the transmission mechanism comprising a transmission provided between the differential gear unit and the HST and having a main portion facing the differential gear unit and an extension extending from the main portion toward one side of the vehicle body widthwise thereof, the transmission extension being provided with the PTO shaft, the transmission including a travel cooperating mechanism and a PTO cooperating mechanism providing the travel power transmission path and the PTO power transmission path respectively. Accordingly the PTO shaft can be positioned toward a second direction. This renders the transmission mechanism simple in construction, shortening the overall length of the vehicle while permitting a transmission shaft connecting the PTO shaft to the input shaft of the work device to be positioned close to a horizontal.

The extension can be made removable from the main portion. When there arises a need to derive a drive force for the work device, the extension is then attached to the transmission main portion which is prepared as a common component. This results in facilitated stock management of parts and ensures ease of alterations of the specifications after the shipment of vehicles.

When the transmission main portion is adapted to accommodate therein the differential gear unit, there is no need to provide a separate casing for the gear unit. This entails a lower cost, for example, due to a reduction in material cost.

The present invention is not limited to the foregoing embodiments but can be modified variously within the scope defined in the appended claims.

What is claimed is:

1. A transmission mechanism for a vehicle having a power transmission path for transmitting power from a drive source installed in a vehicle body through an HST disposed away from the drive source toward a first direction longitudinally of the vehicle body at least to a differential gear unit for driving axles toward the first direction, the transmission mechanism being characterized in that:

a transmission is provided between the HST and the differential unit, the transmission having a casing, an input shaft connected to a drive shaft of the drive source by a shaft, and a first output shaft coupled to the differential gear unit, the input shaft extending from the casing toward a second direction opposite to the first direction, the HST comprising a hydraulic pump having, a pump shaft extending into the transmission casing, and a hydraulic motor cooperative with the hydraulic pump and having a motor shaft extending into the transmission casing, the casing of the transmission being connected as a unit with both a casing of the HST and a casing of the differential gear unit, the casing of the HST facing immediately the drive source, the transmission comprising as housed in the transmission casing a mechanical cooperating mechanism coupling the input shaft to the pump shaft and coupling the motor shaft to the output shaft to provide the power transmission path.

2. A transmission mechanism for a vehicle according to claim 1 which is characterized in that the drive shaft and the input shaft are arranged approximately on the same axis.

3. A transmission mechanism for a vehicle according to claim 1 which is characterized in that:

the vehicle is a work vehicle equipped with a work device positioned toward the first direction externally thereof, the work vehicle having a travel power transmission path for transmitting power from the drive source to the differential gear unit through the HST, and a PTO power transmission path for dividedly transmitting power from the travel power transmission path to a PTO shaft for driving the work device, the casing of the transmission having a main portion facing the differential gear unit and an extension extending from the main portion toward one side of the vehicle widthwise thereof, the PTO shaft projecting from the transmission extension toward the first direction and positioned outwardly of the differential gear unit toward one side of the vehicle widthwise thereof, the transmission casing having housed therein a travel cooperating mechanism and a PTO cooperating mechanism providing the travel power transmission path and the PTO power transmission path respectively.

4. A transmission mechanism for a vehicle having a power transmission path for transmitting power from a drive source installed in a vehicle body through an HST disposed away from the drive source toward a first direction longitudinally of the vehicle body at least to a differential gear unit for driving axles toward the first direction, the transmission mechanism being characterized in that:

a transmission is provided between the HST and the differential unit, the transmission having a casing, an input shaft connected to a drive shaft of the drive source by a shaft, and a first output shaft coupled to the differential gear unit, the input shaft extending from the casing toward a second direction opposite to the first direction, the HST comprising a hydraulic pump having, a pump shaft extending into the transmission casing, and a hydraulic motor cooperative with the hydraulic pump and having a motor shaft extending into the transmission casing, the transmission comprising as housed in the transmission casing a mechanical cooperating mechanism coupling the input shaft to the pump shaft and coupling the motor shaft to the output shaft to provide the power transmission path, said transmission mechanism being further characterized in that:

the mechanical cooperating mechanism comprising a first mechanical cooperating mechanism and a second mechanical cooperating mechanism, the first mechanical cooperating mechanism comprising a first gear supported on the input shaft nonrotatably relative thereto, and a second gear meshing with the first gear and supported on the pump shaft nonrotatably relative thereto, the second mechanical cooperating mechanism comprising a third gear supported on the motor shaft nonrotatably relative thereto, and a fourth gear meshing with the third gear and supported on the first output shaft nonrotatably relative thereto.

5. A transmission mechanism for a vehicle according to claim 4 which is characterized in that:

the pump shaft and the first output shaft are arranged approximately on the same axis and butted against each other, the second gear having an engaging portion on an end face thereof facing toward the first direction, the first output shaft having an annular coupling member supported thereon nonrotatably relative thereto and slidable axially thereof between the fourth gear and the second gear, the coupling member having an engaging portion corresponding to the engaging portion of the second gear and formed on an end face thereof facing toward the second direction, the coupling member being slidable into engagement with the second gear and thereby made rotatable with the second gear.

6. A transmission mechanism for a vehicle according to claim 4, further characterized in that the pump shaft and the motor shaft are arranged in approximately the same horizontal plane.

7. A transmission mechanism for a vehicle having a power transmission path for transmitting power from a drive source installed in a vehicle body through an HST disposed away from the drive source toward a first direction longitudinally of the vehicle body at least to a differential gear unit for driving axles toward the first direction, the transmission mechanism being characterized in that:

a transmission is provided between the HST and the differential unit, the transmission having a casing, an input shaft connected to a drive shaft of the drive source by a shaft, and a first output shaft coupled to the differential gear unit, the input shaft extending from the casing toward a second direction opposite to the first direction, the HST comprising a hydraulic pump having, a pump shaft extending into the transmission casing, and a hydraulic motor cooperative with the hydraulic pump and having a motor shaft extending into the transmission casing, the transmission comprising as housed in the transmission casing a mechanical cooperating mechanism coupling the input shaft to the pump shaft and coupling the motor shaft to the output shaft to provide the power transmission path, said transmission mechanism being further characterized in that:

the transmission casing has a main central portion facing the differential gear unit and an extension extending from the main central portion toward one side of the vehicle widthwise thereof, the transmission having a second output shaft extending from the casing extension toward the second direction for driving axles toward the second direction, the transmission further comprising a third mechanical cooperating mechanism housed in the transmission casing and coupling the motor shaft to the second output shaft.

8. A transmission mechanism for a work vehicle including a vehicle body having one side toward a first direction along the length thereof and the other side toward a second direction opposite to the first direction, the work vehicle comprising a differential gear unit for driving axles positioned toward the first direction, an HST and a drive source which are arranged in the vehicle body from the first direction side toward the second direction, the work vehicle being equipped with a work device positioned toward the first direction externally thereof, the transmission mechanism having a travel power transmission path for transmitting power from the drive source to the differential gear unit through the HST, and a PTO power transmission path for dividedly transmitting power from the travel power transmission path to a PTO shaft for driving the work device, the transmission mechanism being characterized in that:

a transmission is provided between the differential gear unit and the HST, the transmission comprising a casing, an input shaft for receiving the power from the drive source, and a first output shaft coupled to the differential gear unit, the casing having a main portion facing the differential gear unit and an extension extending from the main portion toward one side of the vehicle body widthwise thereof, the PTO shaft projecting from the transmission extension toward the first direction and positioned outwardly of the differential gear unit toward one side of the vehicle widthwise thereof, the transmission casing having housed therein a travel cooperating mechanism and a PTO cooperating mechanism providing the travel power transmission path and the PTO power transmission path respectively.

9. A transmission mechanism according to claim 8 which is characterized in that the differential gear unit is accommodated in the transmission casing main portion.

10. A transmission mechanism according to claim 8 which is characterized in that the transmission casing extension is removably attached to the main portion.

11. A transmission mechanism according to claim 8 which is characterized in that:

the HST comprises a casing, a hydraulic pump having a pump shaft, and a hydraulic motor cooperative with the hydraulic pump and having a motor shaft, the motor shaft having an end portion extending toward the first direction into the transmission casing, the transmission input shaft extending from the transmission casing toward the second direction to extend through the HST casing and being connected to the drive source by a shaft, the input shaft providing the pump shaft within the HST casing, the travel cooperating mechanism and the PTO cooperating mechanism being a gear train coupling the end portion of the motor shaft to the differential gear unit and a gear train coupling the transmission input shaft to the PTO shaft, respectively.

12. A transmission mechanism according to claim 8 which is characterized in that:

the transmission input shaft projects from the transmission casing toward the second direction and is connected to the drive source by a shaft, the HST comprising a casing, a hydraulic pump having a pump shaft, the pump shaft having an end portion extending toward the first direction into the transmission, and a hydraulic motor cooperative with the hydraulic pump and having a motor shaft, the motor shaft having an end portion extending toward the first direction into the transmission, the travel cooperating mechanism having a gear train coupling the transmission input shaft to the end portion of the pump shaft and a gear train coupling the end portion of the motor shaft to the differential gear unit, the PTO cooperating mechanism being a gear train coupling the transmission input shaft to the PTO shaft.

13. A transmission mechanism for a vehicle having a power transmission path for transmitting power from a drive source installed in a vehicle body through an HST disposed away from the drive source toward a first direction longitudinally of the vehicle body at least to a differential gear unit for driving axles toward the first direction, the transmission mechanism being characterized in that:

a transmission is provided between the HST and the differential unit, the transmission having a casing, an input shaft connected to a drive shaft of the drive source by a shaft, and a first output shaft coupled to the differential gear unit, the input shaft extending from the casing toward a second direction opposite to the first direction, the HST comprising a hydraulic pump having a pump shaft extending into the transmission casing, and a hydraulic motor cooperative with the hydraulic pump and having a motor shaft extending into the transmission casing, the transmission comprising as housed in the transmission casing a mechanical cooperating mechanism coupling the input shaft to the pump shaft and coupling the motor shaft to the output shaft to provide the power transmission path, wherein, the pump shaft and the motor shaft arranged in approximately the same horizontal plane, and the input shaft is disposed above said same horizontal plane and positioned between the pump shaft and the motor shaft with respect to the widthwise direction of the vehicle.

\* \* \* \* \*